United States Patent

Nakagawa et al.

[11] Patent Number: 6,025,880
[45] Date of Patent: Feb. 15, 2000

[54] MOVING PICTURE ENCODING SYSTEM AND METHOD

[75] Inventors: Akira Nakagawa; Kimihiko Kazui; Eishi Morimatsu, all of Kawasaki, Japan

[73] Assignee: Fujitsu Limited, Kawasaki, Japan

[21] Appl. No.: 08/965,999

[22] Filed: Nov. 7, 1997

[30] Foreign Application Priority Data

May 1, 1997 [JP] Japan .................................. 9-113959

[51] Int. Cl.⁷ ................................................ H04N 7/50
[52] U.S. Cl. ........................................ 348/416; 348/402
[58] Field of Search .................................. 348/416, 402, 348/407, 413; H04N 7/50

[56] References Cited

U.S. PATENT DOCUMENTS

| | | | |
|---|---|---|---|
| 5,270,813 | 12/1993 | Puri | 348/415 |
| 5,677,735 | 10/1997 | Ueno | 348/415 |
| 5,805,222 | 9/1998 | Nakagawa | 348/401 |

FOREIGN PATENT DOCUMENTS

| | | |
|---|---|---|
| 6-62392 | 3/1994 | Japan . |
| 8-18977 | 1/1996 | Japan . |

*Primary Examiner*—Howard Britton
*Attorney, Agent, or Firm*—Staas & Halsey LLP

[57] ABSTRACT

A moving picture encoding system. There is provided a moving picture encoding system and method for changing the resolution of an original picture that is an object of encoding using a proper criterion, and encoding the picture while preventing deterioration of picture quality. A motion prediction/calculation means provides information of an error in prediction or of randomness of a motion vector which is calculated in the course of or as a result of motion prediction. A resolution determination means determines a resolution for the input picture to be encoded using the information. The input picture is converted into a picture having the determined resolution, and the picture resulting from the conversion is encoded and output.

14 Claims, 4 Drawing Sheets

MOVING PICTURE ENCODING SYSTEM AND METHOD

BACKGROUND OF THE INVENTION

1. Field of the Invention

The present invention relates to a digital moving picture encoding system. More particularly, this invention is concerned with a moving picture hybrid encoding method of dividing an input picture into a plurality of blocks and carrying out motion compensation and orthogonal transformation block by block.

2. Description of the Related Art

A conventional moving picture encoding technique includes a technique stipulated in the international standard H.261 recommended by the Telecommunication Standardization Section of the International Telecommunication Union (ITU-T) and techniques stipulated in the international standards MPEG1 and MPEG2 recommended by the Moving Picture Experts Group (MPEG) (described in the ISO/IEC 11172/13818). These techniques. are generically referred to as a moving picture hybrid encoding method. The fundamentals of the method will be described briefly.

FIG. 1 shows an example of the basic configuration of a conventional moving picture encoding system.

In FIG. 1, a predictive error signal generation means 10 divides an input picture into L rows and M columns of blocks, and calculates by each block of the input motion a prediction error (difference) between the input picture and a predictive picture (0 in an intra case) produced by a prediction parameter (motion vector) calculation means 19 and predictive picture production means 18, which will be described later.

Discrete cosine transform (DCT) that is one kind of orthogonal transformation is performed block by block on the prediction error signal by an orthogonal transformation means 11. Coefficients resulting from DCT and indicating information of the picture (energy distribution) are compressed and quantized appropriately by a quantization means 12. An entropy encoding means 13 carries out reversible encoding using the Huffman code or the like so as to encode quantization coefficients resulting from DCT, a quantizer, prediction parameters (motion vectors), and the like according to the type of a transmission line, and then sends the resulting codes to the transmission line.

A signal quantized by the quantization means 12 is subjected to inverse quantization by an inverse quantization means 14 and to inverse DCT (IDCT) by an inverse orthogonal transformation means 15, whereby the prediction error signal is restored. A decoded picture production means 16 adds the restored prediction error signal and the predictive picture produced by the predictive picture production means 18 so as to restore an original input picture, and stores the original input picture temporarily in a decoded picture memory means 17 so that the original input picture reconstructed can be used as a predictive picture for subsequent input pictures. A prediction parameter calculation means 19 calculates and extracts prediction parameters for a subsequent picture by comparing an original input picture with the decoded input picture. The predictive picture production means 18 produces a subsequent predictive picture on the basis of the results of calculation and the predictive picture stored in the decoded picture memory means 17.

According to the foregoing moving picture hybrid encoding method, a large amount of information is produced when encoding a scene change in which the contents of a screen are changed instantaneously or rapid motion occurs in a moving picture. An amount of information assigned to each frame may exceed a reference value. In this case, the quality of a picture to be transmitted may deteriorate greatly or too many frames may be abandoned. This results in a poor subjective impression.

To avoid the above phenomenon, it has been a matter of common practice in the past that several pictures having different resolutions are produced by converting an input picture and switched properly. This method of switching several pictures has been disclosed in, for example, Japanese Unexamined Patent Publication No. 7-30901 or 7-95566. Prediction parameters (motion vectors) calculated by the prediction parameter (motion vector) calculation means 19 are used to calculate an average magnitude of all the motion vectors. Based on the magnitude, one of the plurality of resolutions is selected and an associated picture is sent over a transmission line.

However, the prior arts disclosed in the Japanese Unexamined Patent Publication Nos. 7-30901 and 7-95566 have the problems described below.

Specifically, there is a problem that when an average motion vector is large but an amount of information to be transmitted is small, the selection of an unnecessarily low resolution invites deterioration of picture quality.

For example, when a whole picture in a screen simply moves in the one direction, an average vector is large and motion prediction itself is carried out efficiently. Moreover, a variation among vectors is small so that an amount of produced information is small. In this case, according to the foregoing prior art, there arises a problem that although it is possible to transmit a high-quality picture having a high resolution, the picture is switched to a picture of deteriorated quality.

SUMMARY OF THE INVENTION

Accordingly, an object of the present invention is to provide a moving picture encoding system and method capable of encoding a picture that makes a natural motion while preventing deterioration of picture quality by changing the resolution of an original picture input that is an object of encoding, by using an appropriate criterion.

According to the present invention, there is provided a digital moving picture encoding system for dividing a picture into an appropriate number of blocks and carrying out motion compensation block by block. The digital moving picture encoding system comprises a motion prediction/calculation means for providing given information concerning a difference between an input picture and predictive picture calculated relative to each block in the course of or as a result of motion prediction; a resolution determination means for determining a resolution for the input picture to be encoded using the given information provided by the motion prediction/calculation means; an input picture conversion means for converting the input picture into a picture having a resolution determined by the resolution determination means; and an output picture encoding means for encoding and outputting the picture produced by the input picture conversion means.

The resolution determination means uses a scale indicating a prediction error, that is, a sum of errors in prediction relevant to each block calculated during motion prediction based on a frame to be encoded or a previous frame as the given information, or uses a scale indicating randomness in the direction of a motion vector expressing each block within a frame calculated during motion prediction based on a frame to be encoded or a previous frame as the given information. The scale indicating a prediction error and the scale indicating randomness in the direction of a motion vector are used in combination.

The resolution determination means includes a monitoring facility for monitoring a buffer occupation ratio at which a buffer interposed between the encoding system and a transmission line is occupied. When the buffer occupation ratio detected by the monitoring facility is high, a lower resolution is selected. When the buffer occupation ratio is low, a higher resolution is selected. As the scale indicating a prediction error concerning each block, a scale based on a difference between an input original picture and predictive picture is used when the block concerned is subjected to inter-frame encoding, and a scale based on the complexity of the input original picture itself is used when the block concerned is subjected to intra-frame encoding.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 2:
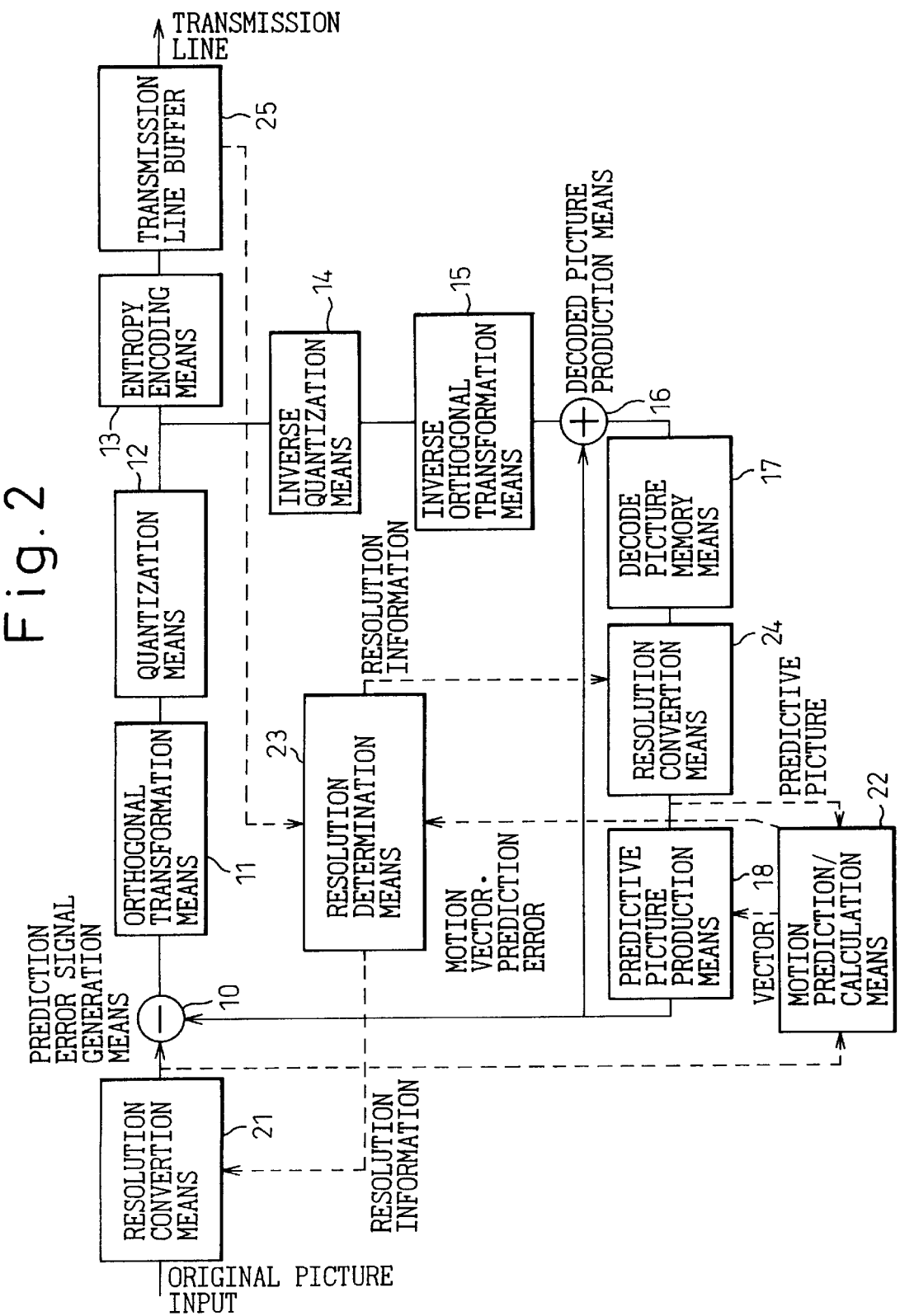
FIG. 2 is a block diagram showing the basic configuration of a moving picture encoding system of the present invention.

FIG. 2 shows the basic configuration of a moving picture encoding system in accordance with the present invention.

Figure 1:
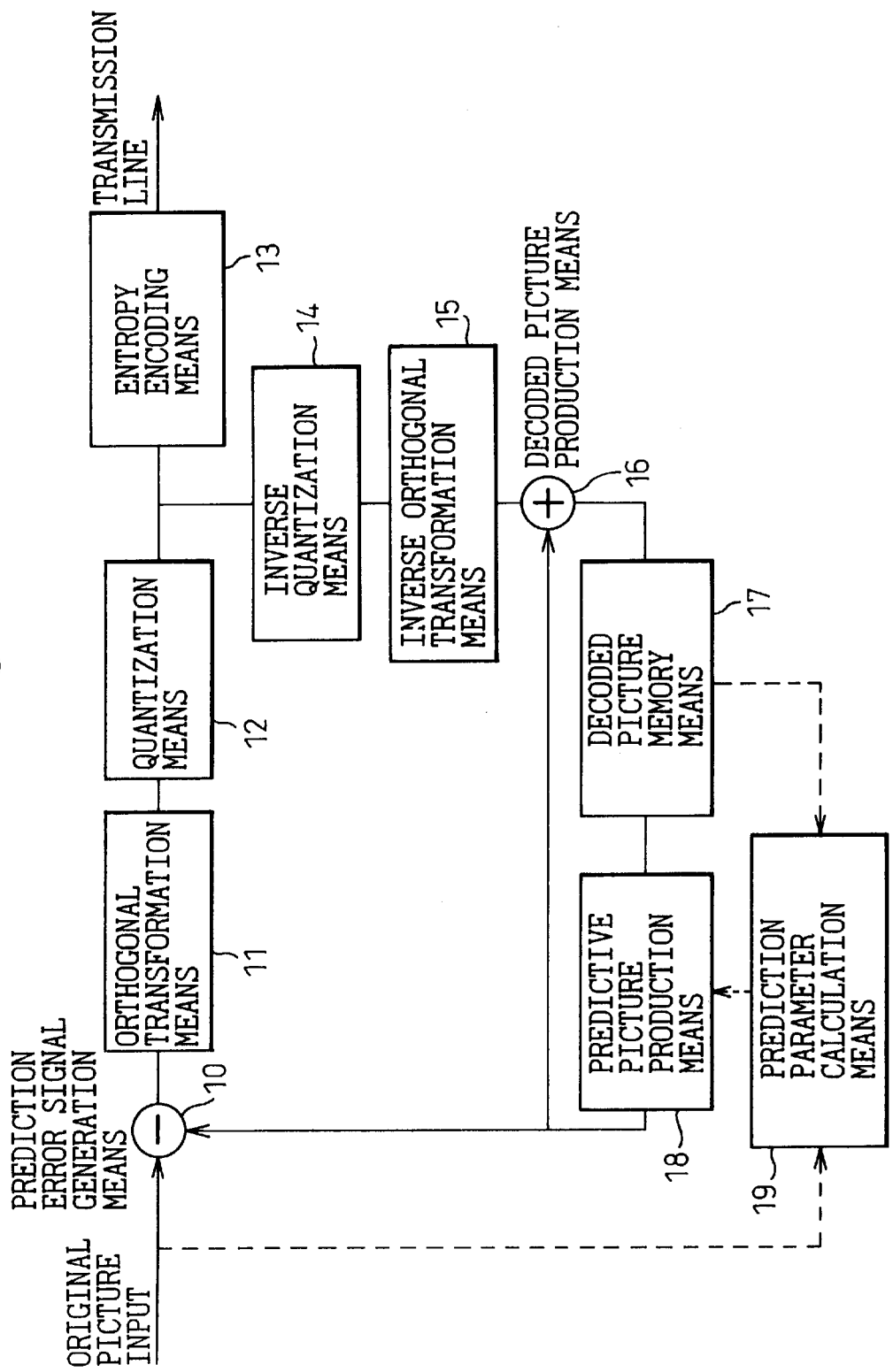
FIG. 1 is a block diagram showing an example of the configuration of a conventional moving picture encoding system.

In FIG. 2, the same reference numerals are assigned to components identical to those of the conventional system shown in FIG. 1. The components will not be described. In FIG. 2, a resolution determination means 23 and resolution conversion means 21 and 24 are newly added to the components of the conventional system shown in FIG. 1. A motion prediction/calculation means 22 in FIG. 2 is comparable to the prediction parameter calculation means 19 in FIG. 1. A transmission line buffer 25 is provided in relation to the resolution determination means 23.

To begin with, the correlation between the means in accordance with the present invention shown in FIG. 2 will be described.

In FIG. 2, the motion prediction/calculation means 22 calculates given information (information of a motion vector or information of a prediction error) concerning a motion vector on the basis of predictive pictures provided by the resolution conversion means 21 and 24. The resolution determination means 23 uses a given scale (scale indicating a prediction error or scale indicating randomness) to judge from the given information whether or not an amount of information produced for encoding a picture to be transmitted to a transmission line is large, and determines a resolution for the picture on the basis of the judgment.

The resolution determination means 23 determines a resolution in consideration of a buffer occupation ratio of the transmission line buffer 25. The resolution conversion means 21 and 24 change resolutions, of a picture, on the basis of information of a resolution determined by the resolution determination means 23. As a result, an original input picture signal is converted into a picture signal having the resolution and transmitted as a picture signal representing an appropriate amount of information (quality) to a transmission line.

Referring FIGS. 3 to 5 in addition to FIG. 2, the present invention will be described below.

Figure 3:
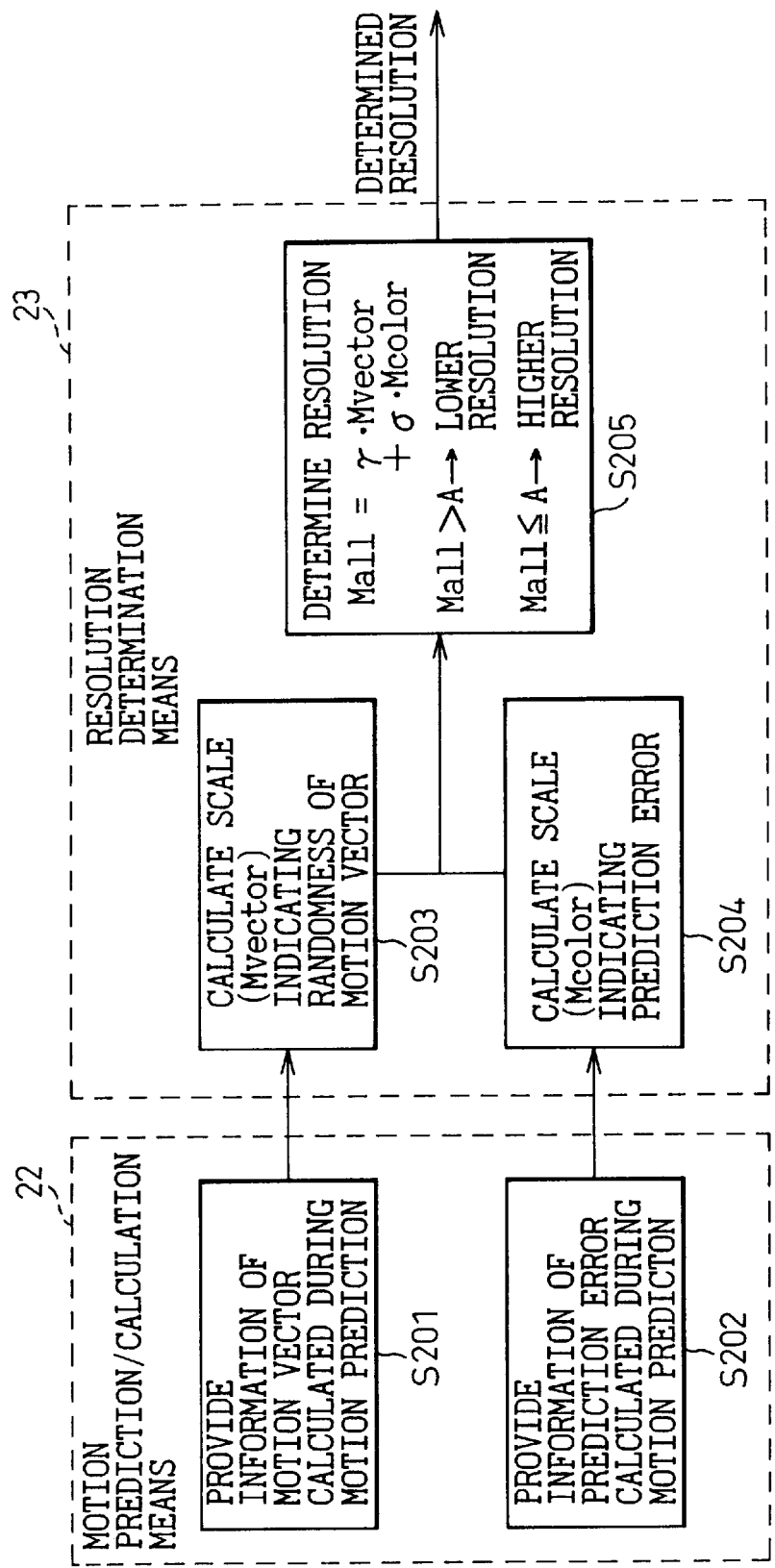
FIG. 3 is a diagram showing an example of a resolution determination chart in accordance with the present invention.

FIG. 3 is a diagram showing an example of a resolution determination chart in accordance with the present invention.

Figure 4:
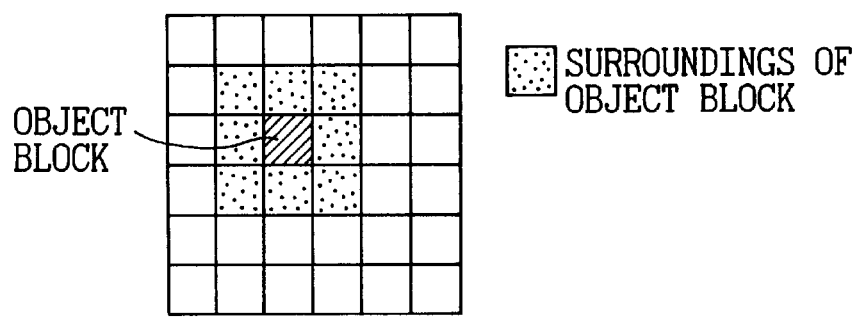
FIG. 4 is a diagram showing an example of a block that is an object of randomness calculation and its surroundings.

FIGS. 4 and 5 are explanatory diagrams concerning a scale indicating randomness to be described later. FIG. 4 shows an example of a block that is an object of randomness calculation and its surroundings. FIG. 5 shows an example of randomness of motion vectors.

The motion prediction/calculation means 22 in FIG. 2 generally uses block matching as motion compensation. The block matching is such that a predictive picture is slid to search for an area matched with a block of an input original picture. In a picture encoding system using motion compensation, motion prediction based on each block is a kind of picture analysis means. Information resulting from motion prediction expresses the features of a picture quantitatively faithfully and is therefore useful in the judgment of a resolution in accordance with the present invention. According to the present invention, information of a motion vector calculated as information provided by the motion prediction/calculation means 22 during motion prediction and information of a prediction error calculated during motion prediction are employed (S201 and S202) as shown in FIG. 3.

The resolution determination means 23 shown in FIG. 3 determines a resolution of a picture signal to be transmitted to a transmission line according to an evaluation scale on the basis of the information calculated by the motion prediction/calculation means 22. According to the present invention, the first evaluation scale is the "scale indicating a prediction error" and the second evaluation scale is the "scale indicating randomness of a motion vector."

At the step of calculating a scale indicating a prediction error (S204) in FIG. 3, normally, a difference in pixel value between an original picture and predictive picture is calculated block by block, and differences calculated relative to a whole block are summed. According to the present invention, scales indicating prediction errors relevant to the whole of a frame concerned or previous frame are summed. The sum is compared with a certain reference value in order to determine a resolution. The reference value may be selected from among a plurality of reference values associated with a kind of resolutions.

When scales indicating prediction errors are calculated using a frame that is an object of encoding, the calculation becomes complex while the precision in changing resolutions improves. In contrast, when scales indicating prediction errors which are calculated using a previous frame are used, the precision in changing resolutions decreases a little but the calculation is very simple. Moreover, since a prediction error is encoded according to encoding using motion compensation, a scale indicating a prediction error employed in the present invention has great correlation to an amount of information produced for colors relevant to a block concerned. Using such prediction errors, therefore, an amount of information produced for luminance relevant to a frame concerned can be predicted. In general, an amount of information produced for encoding colors in a frame and an amount of information produced for encoding a whole picture have close correlation.

According to the present invention, the resolution of an input picture is changed using a prediction error so that an amount of information predictively produced for an encoded picture is set to a proper value. Thus, when the picture is complex, a lower resolution is adopted. When the picture is simple, a higher resolution is adopted. This results in an encoded picture having a small number of skipped frames and appearing entirely smooth.

At the step of calculating a scale indicating randomness of a motion vector (S203) in FIG. 3, separate from the foregoing reference for changing resolutions, randomness in direction of a vector of each block, which has been calculated during motion compensation based on a frame concerned or a previous frame, is measured and used as a scale for changing resolutions.

Figure 5A:
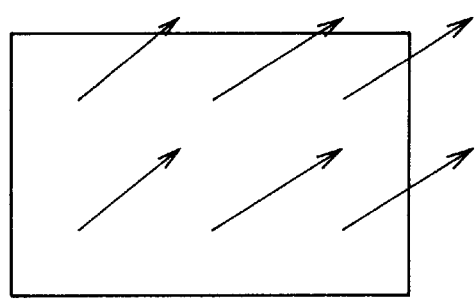
FIGS. 5a and 5b are diagrams showing examples of randomness of motion vectors.

For encoding a vector of each block calculated during motion compensation, in general, the correlation between vectors of adjacent blocks is employed. In this case, the amount of information required for encoding a vector does not depend heavily on an average magnitude of vectors. For example, as shown in FIG. 5a, when a whole screen is seen moving uniformly (uniform vectors), an average magnitude of the vectors is large. However, since the correlation between adjacent vectors is high, a large amount of information is not produced for encoding a difference of each vector from another.

Figure 5B:
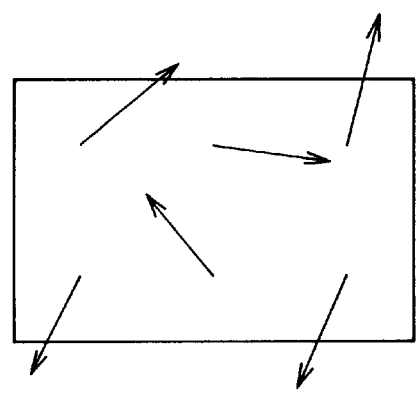

By contrast, as shown in FIG. 5b, an amount of information required for encoding a vector has great correlation to the randomness of the vector. As the randomness in direction of a vector is great, the correlation with an adjacent vector cannot be utilized for encoding. The encoding therefore requires a large amount of information. By utilizing a scale indicating randomness of a vector, an amount of information produced for encoding information of vectors relevant to a frame concerned can be predicted. The randomness of a vector has great correlation to a total amount of information produced relevant to a frame.

Moreover, an amount of information of a vector after encoding only vector information may be used as a scale indicating randomness of the vector. In particular, in a system for judging a resolution on the basis of information relevant to a previous frame, an amount of information assigned to motion information relevant to the previous frame can be calculated readily and may be used as a scale indicating randomness of a vector.

The resolution of an input picture is changed using a scale indicating randomness of a vector so that an amount of information predictively produced for an encoded picture is set to a proper value. When the picture is complex, the lower resolution is adopted. When the picture is simple, the higher resolution is adopted. Thus, an encoded picture having a small number of skipped frames and appearing entirely smooth can be realized.

For changing resolutions more stably and reliably, a new reference for changing resolutions that is a combination of the reference using a prediction error and the reference using randomness in direction of a vector may be employed. An amount of information required for encoding a picture is nearly equal to a sum of an amount of information of vectors and an amount of information of colors. When the scale indicating a prediction error and scale indicating randomness of a vector are used in combination, an amount of information produced for a frame concerned can be predicted more accurately. The value of the combination is used as a reference, whereby resolutions can be changed more precisely.

FIG. 3 shows an example of resolution determination using the above combination (S203 to S205). In the example, two resolutions defined in the H.261 of the ITU-T, that is, resolution CIF (352 pixels * 288 lines, a maximum of 30 frames per sec.) and resolution QCIF (176 pixels * 144 lines, a maximum of 30 frames per sec.) are changed. In FIG. 3, the resolution determination means 23 determines a resolution for an input picture to be encoded and a reference picture according to information relevant to a previous frame provided by the motion prediction/calculation means 22. Based on the result of the determination, the resolution conversion means 21 and 24 (FIG. 2) convert the input picture and reference picture to pictures having an intended resolution.

To begin with, the "scale indicating a prediction error (Mcolor)" used as the first evaluation scale, that is, a sum of differences in pixel value between an original picture and predictive picture relative to a whole block will be described (Refer to step S204 in FIG. 3).

A certain block of a picture will be taken care. If the block is subjected to inter-frame encoding, a scale indicating a prediction error relevant to the block (summation of square errors) is defined as follows:

$$SSE = \sum_{i,j=0}^{N,N} (\text{Org}_{i,j} - \text{Prev}_{i,j})^2 \qquad (1)$$

where N denotes the size of the block, Org denotes an input original picture, and Prev denotes a block of a reference picture matched with the block of the original picture. The value SSE has great correlation to an amount of information produced when encoding colors during inter-frame encoding.

Moreover, when the block is subjected to intra-frame encoding, an activity ACT is defined as follows:

$$ACT = \sum_{i,j=0}^{N,N} \text{Org}_{i,j}^2 - \frac{1}{N^2}\left(\sum_{i,j=0}^{N,N} \text{Org}_{i,j}\right)^2 \qquad (2)$$

The value ACT has great correlation to an amount of information produced when encoding colors during intra-frame encoding.

The expressions SSE and ACT are joined using appropriate coefficients α and β, thus producing a new scale Mcolor as a common scale for information of colors.

$$Mcolor_m = \begin{cases} \alpha \cdot SSE_m & \text{for inter blocks} \\ \beta \cdot ACT_m & \text{for intra blocks} \end{cases} \qquad (3)$$

where subscript m denotes a block number.

Next, the "scale indicating randomness of a vector (Mvector)" that is the second evaluation scale will be described (Refer to step S203 in FIG. 3). First, two states of vectors shown in FIGS. 5a and 5b are discussed for a better understanding of the meaning of "randomness of a vector." Each arrow indicates a vector expressing each block. Averages of absolute values of magnitudes of vectors shown in FIGS. 5a and 5b shall be the same as each other. The conventional method takes account of only the magnitudes of vectors. If an average of magnitudes is large, a lower resolution is selected.

However, the vectors in FIG. 5a are uniform. An amount of information produced is therefore small. Although the information is accurate enough to be encoded properly, there is the fear that a lower resolution may be selected. Randomness of a vector is therefore used as a scale for changing resolutions so that only when a large amount of information is produced as shown in FIG. 5b, a lower resolution is selected.

Assume that eight blocks surrounding an object block (m) are defined as shown in FIG. 4. Differences of the block from the surrounding blocks are used to define randomness of a vector expressing a certain block (Mvector) as follows:

$$Mvector_m = \sum_{lnS} |Vx_m - vx_1| + \sum_{lnS} |Vy_m - Vy_1| \quad (4)$$

where S denotes a set of blocks contained in an area surrounding the object block in FIG. 4. The value Mvector has great correlation to an amount of information produced when encoding information of a motion.

In another embodiment, an amount of information assigned to information of a vector during encoding is used as a scale indicating randomness of a vector. In this case, assuming that a total amount of information of a vector is Bvector, the following equation is established:

Mvector=Bvector

Next, a scale that is a combination of the scale indicating a prediction error and the scale indicating randomness of a vector will be defined. Herein, when the scales Mcolor and Mvector are expressed as follows:

$$Mcolor = \sum_{m=0}^{M-1} Mcolor_m \quad (5)$$

$$Mvector = \sum_{m=0}^{M-1} Mvector_m \quad (6)$$

an expression (M_all) used to accurately estimate the trend of an amount of information produced for a frame concerned can be written using the expressions (5) and (6) and appropriate coefficients γ and δ as follows (Refer to step S205 in FIG. 3):

$$M\_all = \gamma \cdot Mcolor + \delta \cdot Mvector \quad (7)$$

where M denotes the number of all blocks within the frame.

By comparing the value M_all with a threshold, an optimal resolution can be selected for fear a difference of an amount of information produced for one frame for which another frame might be too large.

For example, when the current resolution is resolution QCIF, if the value M_all is larger than a threshold A1, M_all>A1 the resolution QCIF remains unchanged. By contrast, if

M_all≦A1 the resolution QCIF is changed to resolution CIF.

Moreover, when the current resolution is resolution CIF, if the value M_all is larger than a threshold A2, M_all>A2 the resolution CIF remains unchanged.

In addition to the aforesaid scales, for changing resolutions more stably and reliably, an amount of encoded information stored in the transmission line buffer 25 located between the encoding system and a transmission line as shown in FIG. 2 may be monitored and reflected on changing of resolutions.

In general, an amount of information produced per unit time in a picture encoding system is not constant. However, since the amount of information transferred over a transmission line per unit time is constant, the transmission line buffer 25 is included in a transmission line interface for matching the amounts of information. An amount of information produced in the encoding system must be controlled to avoid missing information because of underflow or overflow of information in the buffer 25.

The resolution determination means 23 therefore monitors the buffer located between the encoding system and transmission line. When the buffer occupation ratio of picture data is large, a lower resolution permitting production of a small amount of information is selected in order to prevent overflow of information in the buffer. In contrast, when the buffer occupation ratio of picture data is small, a higher resolution permitting production of a large amount of information is selected in order to prevent underflow of information in the buffer. Thus, resolutions can be changed more optimally.

In the example shown in FIG. 3, encoded information produced by the encoding system is transmitted at a fixed rate to a transmission line. Therefore, when a ratio at which the bit-stream buffer 25 shown in FIG. 2 is occupied is larger than a threshold B1, the threshold for changing, A1, is changed to the smaller threshold in order to facilitate selection of the lower resolution QCIF. In contrast, when the bit-stream buffer 25 is smaller than a threshold B2, the values of A1 and A2 are made larger, so as to select the higher resolution CIF. Thus, since a plurality of thresholds are used for comparison, an optimal resolution can be selected to prevent a difference in an amount of information produced for a frame from that for another frame being too large.

In an encoding method using motion compensation, generally, inter-frame encoding and intra-frame encoding are switched appropriately block by block. In this case, when a scale indicating a sum of differences in pixel value between an original picture and predictive picture relative to a whole block is employed for a block to be subjected to inter-frame encoding, and a scale indicating randomness of an input block concerned is employed for a block to be subjected to intra-frame encoding, an amount of produced information can be predicted. If a sum of such scales relevant to blocks within a frame is used as a scale for determining a resolution, resolutions can be changed even for the encoding method.

According to the present invention, a scale indicating a prediction error or a scale indicating randomness of a vector is used to determine a resolution of a picture. Even when encoding is difficult, that is, when a portion of an original picture that is an object of encoding depicts a rapid motion or a scene change, an excess amount of information will not be assigned to one frame. A picture can be encoded with few frames skipped and a smooth motion.

What is claimed is:

1. A digital moving picture encoding system for dividing a picture into an appropriate number of blocks and carrying out motion compensation block by block, comprising:

motion prediction/calculation means for calculating an error in prediction relevant to each block during motion prediction based on a frame to be encoded or a previous frame;

resolution determination means for determining a resolution for an input picture to be encoded using a scale indicating a prediction error, that is, a sum of errors in prediction calculated by said motion prediction/calculation means; and input picture conversion means for converting the input picture into a picture having a resolution determined by said resolution determination means.

2. A digital moving picture encoding system for dividing a picture into an appropriate number of blocks and carrying out motion compensation block by block, comprising:

motion prediction/calculation means for calculating a value indicating randomness in direction of a motion vector expressing each block within a frame during motion prediction based on a frame to be encoded or a previous frame;

resolution determination means for determining a resolution for an input picture to be encoded using a scale indicating randomness of a motion vector, that is, the value indicating randomness in direction of a motion vector within a frame calculated by said motion prediction/calculation means; and input picture conversion means for converting the input picture into a picture having a resolution determined by said resolution determination means.

3. A digital moving picture encoding system for dividing a picture into an appropriate number of blocks and carrying out motion compensation block by block, comprising:

motion prediction/calculation means for calculating an error in prediction relevant to each block during motion prediction based on a frame to be encoded or a previous frame, and a value indicating randomness in direction of a motion vector within the frame;

resolution determination means for determining a resolution for an input picture to be encoded using a scale indicating a prediction error, that is, a sum of errors in prediction calculated by said motion prediction/calculation means and a scale indicating randomness of a motion vector, that is, a value indicating randomness in the direction of a motion vector within the frame, which are calculated by said motion prediction/calculation means; and input picture conversion means for converting the input picture into a picture having a resolution determined by said resolution determination means.

4. The moving picture encoding system according to claim 1, wherein as for the scale indicating a prediction error relevant to each block, when a block concerned is subjected to inter-frame encoding, a scale based on a difference between an input original picture and predictive picture is employed; and when the block concerned is subjected to intra-frame encoding, a scale based on complexity of the input original picture itself is employed.

5. The moving picture encoding system according to claim 3, wherein as for the scale indicating a prediction error relevant to each block, when a block concerned is subjected to inter-frame encoding, a scale based on a difference between an input original picture and a predictive picture is employed; and when the block concerned is subjected to intra-frame encoding, a scale based on complexity of the input original picture itself is employed.

6. The moving picture encoding system according to claim 1, wherein said resolution determination means includes a monitoring facility for monitoring an occupation ratio of a buffer placed between said encoding system and a transmission line; and, when the buffer occupation ratio is high, determines the lower resolution; and when the buffer occupation ratio is low, determines the higher resolution.

7. The moving picture encoding system according to claim 2, wherein said resolution determination means includes a monitoring facility for monitoring an occupation ratio of a buffer placed between said encoding system and a transmission line; and, when the buffer occupation ratio is high, determines the lower resolution; and, when the buffer occupation ratio is low, determines the higher resolution.

8. The moving picture encoding system according to claim 3, wherein said resolution determination means includes a monitoring facility for monitoring an occupation ratio of a buffer placed between said encoding system and a transmission line; and, when the buffer occupation ratio is high, determines the lower resolution; and when the buffer occupation ratio is low, determines the higher resolution.

9. The moving picture encoding system according to claim 4, wherein said resolution determination means includes a monitoring facility for monitoring an occupation ratio of a buffer placed between said encoding system and a transmission line; and, when the buffer occupation ratio is high, determines the lower resolution; and when the buffer occupation ratio is low, determines the higher resolution.

10. The moving picture encoding system according to claim 5, wherein said resolution determination means includes a monitoring facility for monitoring an occupation ratio of a buffer placed between said encoding system and a transmission line; and, when the buffer occupation ratio is high, determines the lower resolution; and when the buffer occupation ratio is low, determines the higher resolution.

11. A digital moving picture encoding method for dividing a picture into an appropriate number of blocks and carrying out motion compensation block by block, comprising steps of:

calculating a sum of errors in prediction relevant to each block during motion prediction based on a frame to be encoded or a previous frame;

converting an input picture into a picture having the lower resolution when the sum of errors in prediction exceeds a given threshold;

converting the input picture into a picture having the higher resolution when the sum of errors in prediction falls below the given threshold; and encoding and outputting the picture resulting from the conversion.

12. The digital moving picture encoding method for dividing a picture into an appropriate number of blocks and carrying out motion compensation block by block, comprising steps of:

calculating a value indicating randomness in direction of a motion vector expressing each block within a frame during motion prediction based on a frame to be encoded or a previous frame;

converting an input picture into a picture having the lower resolution when the value indicating randomness exceeds a given threshold;

converting the input picture into a picture having the higher resolution when the value indicating randomness falls below the given threshold; and encoding and outputting the picture resulting from the conversion.

13. The moving picture encoding method according to claim 11, further comprising a step at which, when a buffer for temporarily storing an encoded picture has a high occupation ratio, the given threshold is lowered in order to tend toward conversion into a picture having the lower resolution, and when the buffer occupation ratio is low, the given threshold is raised in order to tend toward conversion into a picture having the higher resolution.

14. The moving picture encoding method according to claim 12, further comprising a step at which when a buffer for temporarily storing an encoded picture has a high occupation ratio, the given threshold is lowered in order to tend toward conversion into a picture having the lower resolution, and when the buffer occupation ratio is low, the given threshold is raised in order to tend toward conversion into a picture having the higher resolution.

* * * * *